United States Patent [19]

Tanemura

[11] Patent Number: 4,610,146

[45] Date of Patent: Sep. 9, 1986

[54] OPERATING CONTROL DEVICE FOR AIR CONDITIONER FOR USE IN VEHICLE

[75] Inventor: Yukio Tanemura, Tokyo, Japan

[73] Assignee: Nissan Motor Co., Ltd., Yokohama, Japan

[21] Appl. No.: 682,290

[22] Filed: Dec. 17, 1984

[30] Foreign Application Priority Data

Dec. 15, 1983 [JP] Japan .................................. 58-235145

[51] Int. Cl.⁴ .......................... B60H 1/32; F25B 27/00
[52] U.S. Cl. ..................................... 62/133; 62/323.4; 123/198 R
[58] Field of Search ....................... 62/133, 243, 323.1, 62/323.4; 165/43; 123/198 D, 357, 198 R

[56] References Cited

U.S. PATENT DOCUMENTS

| | | | |
|---|---|---|---|
| 3,186,184 | 6/1965 | Pruitt | 62/323.1 X |
| 4,226,090 | 10/1980 | Horian | 62/323.1 X |
| 4,334,255 | 6/1982 | Izumi | 62/133 X |
| 4,488,410 | 12/1984 | Seiderman | 62/323.4 X |
| 4,492,196 | 1/1985 | Oshizawa | 123/198 D X |

Primary Examiner—Harry Tanner
Attorney, Agent, or Firm—Schwartz, Jeffery, Schwaab, Mack, Blumenthal & Evans

[57] ABSTRACT

An operating control device for an air conditioner for use in a vehicle comprises a temperature sensor for sensing the temperature of a fuel supplied into the engine, and a detector switch for detecting deep depression of an accelerator pedal. The operating control device further comprises an operating control circuit comprising a first relay circuit operative when the fuel temperature sensed by the temperature sensor is above a predetermined value, and a second relay circuit operative when the first relay circuit is activated and when it is detected by said detector means that the accelerator pedal has been deeply depressed to interrupt a power supply circuit including the compressor, thereby enabling to securely detect an increase in an engine load during a driving on an ascending load surface to interrupt the operation of the compressor to attain sufficient vehicle drive performance.

7 Claims, 4 Drawing Figures

OPERATING CONTROL DEVICE FOR AIR CONDITIONER FOR USE IN VEHICLE

BACKGROUND OF THE INVENTION

The present invention relates to an operating control device for an air conditioner for use in a vehicle wherein when a load applied to an engine increases while a driving on an ascending hill or road surface, the device is operative so as to allow a compressor for the air conditioner to be inoperative to maintain sufficient vehicle drive performance.

Heretofore, in vehicles in which an air conditioner is provided, particularly in diesel engine driven vehicles, a control system is provided to halt or interrupt the air conditioning operation when a heavy load on the engine is detected during its run on an acsending road surface, because of a reduction in the driving performance of the vehicle with the air conditioner being operated in a cooling mode.

It has been known to provide for the air conditioner with an operating control device comprising an electromagnetic relay connected to a compressor and a negative pressure detector which renders the relay turned off so as to lessen the load applied to the engine due to the operation of the compressor, when an accelerator pedal is depressed due to driving on an ascending road surface and thus the negative pressure at an intake manifold decreases.

However, with the conventional device in which decrease of a negative pressure in the intake manifold is detected, even when a vehicle accelerates during run on a flat or level road surface in which an inoperative condition of the compressor is not required, there is a possibility that the operation of the compressor is interrupted due to a decrease in the negative pressure of the engine, resulting in the problem that the cooling capacity is lowered.

Further, another prior art device is also known, in which the operation of the compressor is halted when an increase in the engine load is detected through a rise in the cooling water temperature. However, with this device, since it is likely to have a time delay in the rise of the water temperature with respect to an increase in the engine load, it is impossible to stop the operation of the compressor unless the hill climbing run continues for more than certain time, thus resulting in the problem that a time delay cannot be avoided in the compressor interruption control.

SUMMARY OF THE INVENTION

With the above in view, an object of the present invention is to provide an operating control device for an air conditioner for use in a vehicle capable of securely detecting an increase in an engine load a driving on an ascending road surface to interrupt the operation of the compressor in response thereto.

Another object of the present invention is to provide an operating control device for an air conditioner for use in a vehicle which is configured in such a manner that the operation of the compressor is not interrupted undesirably in response to acceleration on a level road etc.

According to the present invention, there is provided an operating control device for an air conditioner for use in a vehicle which detects an increase in the engine load during a hill climbing run of the vehicle without an appreciable delay time by means of sensing fuel temperature having a response faster than that of water temperature, thereby ceasing the operation of the compressor when the fuel temperature thus sensed is above a predetermined value and when the accelerator pedal is depressed.

BRIEF DESCRIPTION OF THE DRAWINGS

The features and advantages of an operating control device for an air conditioner for use in a vehicle according to the present invention will become more apparent from the following description taken in conjunction with the accompanying drawings, in which.

DETAILED DESCRIPTION OF THE PREFERRED EMBODIMENTS

To facilitate the understanding of the present invention, a brief reference will be made to a conventional device.

Figure 1:
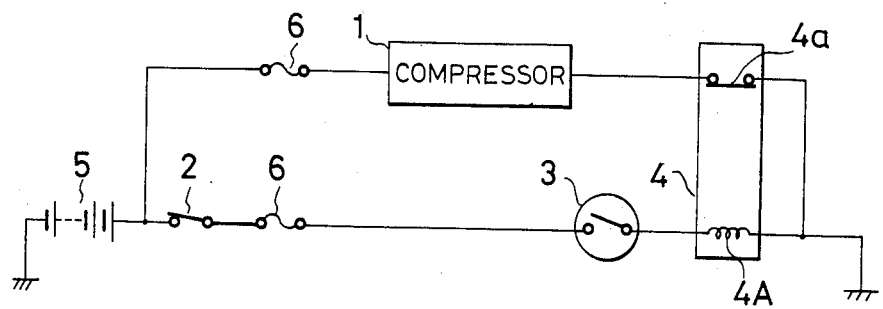
FIG. 1 is a circuit diagram illustrating a conventional operating control device for an air conditioner for use in a vehicle.

Referring to FIG. 1, there is shown a typical circuit arrangement of a conventional device of this type (e.g. shown in Japanese Utility Model Published Application No. 57-117212) constituted so as to detect an increase in an engine load to interrupt the operation of the compressor in accordance with a negative pressure at an intake manifold. As seen from this figure, the electric circuit for controlling the operation of an airconditioner comprises a compressor 1 which is controlled by means of an electromagnetic clutch (not shown), a key-switch 2, a negative pressure detector switch 3 which turns on in response to a certain decrease of negative pressure in the intake manifold, and an electromagnetic relay 4 comprising a winding 4A and a normally closed contact 4a which is opened when the winding 4A is energized. The electric circuit further includes a battery 5 and fuse elements 6.

In operation, during usual driving conditions, since the negative pressure detector switch 3 is turned off and the winding 4A is not energized, the contact 4a is in a closed condition, thus continuing the operation of the compressor 1. On the other hand, when an accelerator pedal is depressed due to driving on an ascending road surface, causing the negative pressure to decrease, the negative pressure detector switch 3 turns on in response thereto. Accordingly, the winding 4A is energized to open the normally closed contact 4a so that the operation of the compressor 1 is stopped. Thus, this lessens the load applied to the engine due to the operation of the compressor, thus providing vehicle drive performance sufficient for hill climbing operation.

However, with the conventional device configured so as to detect decrease of an engine negative pressure as shown in FIG. 1, even when a vehicle is accelerated during driving on a flat or level road surface in which an inoperative condition of the compressor is not required, there is possibility that the operation of the compressor is interrupted due to a decrease in the negative pressure of the engine, resulting in the problem that the cooling capacity is lowered.

Figure 2:
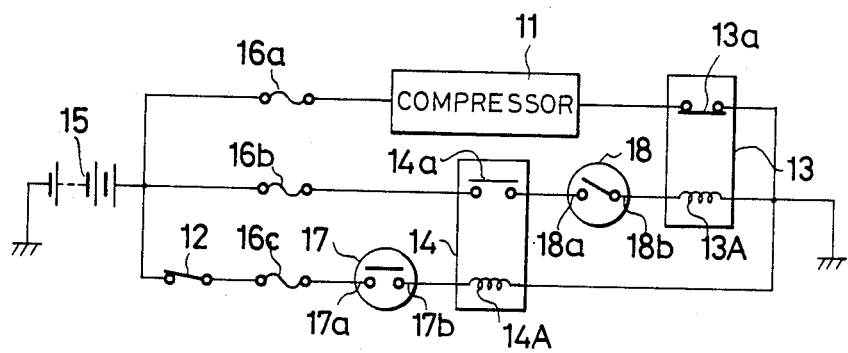
FIG. 2 is a circuit diagram illustrating an embodiment of an operating control device for an air conditioner for use in a vehicle according to the present invention.

Referring to FIG. 2, there is shown an circuit diagram illustrating an embodiment of an operating control device for an air conditioner for use in a vehicle according to the present invention.

In the circuit constituting the operating control device of the invention, similar to that shown in FIG. 1, there is provided a compressor 11, an electromagnetic relay 13 comprising a winding 13A and a normally closed contact 13a a key switch 12, fuse elements 16a, 16b and 16c and a battery 15. The circuit is further provided with an electromagnetic relay 14 comprising a winding 14A and a normally open contact which is closed when the winding 14A is energized.

In addition, the circuit is provided with two switch elements. One switch element is a thermoswitch 17 which is operative to close a contact in accordance with the fuel temperature, e.g. in a condition that the temperature detected by the thermoswitch 17 is above 80° C. For instance, for a diesel engine automobile, thermoswitch 17 is usually provided in the course of fuel supply piping connected to a fuel injection pump. For a gasoline engine automobile with an electronically controlled fuel injection unit, it may be provided in the course of fuel supply piping connected to a fuel injector.

The thermoswitch 17 has one terminal 17a connected to the power source 15 through the key switch 12 and the fuse 16c and the other terminal 17b grounded through the winding 14A of the relay 14.

The other switch element is a detector switch 18 configured so as to close its contact in response to the deep depression of the accelerator pedal. The detector switch 18 has one terminal 18a connected to the power source 15 through the fuse element 16b and the normally open contact 14a of the relay 14, and the other terminal grounded through the winding 13A of the relay 13.

In the embodiment shown in FIG. 2, the thermoswitch 17 for detecting increase in engine load is used to sense fuel temperature. The reason why fuel temperature is selected is that temperature changes of the fuel in the high engine load condition are larger than those of engine cooling water as in the prior art, thereby the embodiment can detect engine load condition with higher precision.

The operation of the embodiment shown in FIG. 2 will be described.

During the usual driving, e.g. when a vehicle runs on a flat road surface, the thermoswitch 17 is kept turned off because the fuel temperature sensed is low. As a result, the normally open contact 14a is opened because of deenergization of the winding 14A. Accordingly, in this condition even if the detector switch 18 is turned on due to acceleration of the vehicle, the relay winding 13A is not energized. Namely, since the normally closed contact 13a of the relay 13 is not opened, the operation of the compressor 11 is not interrupted undesirably due to the acceleration during the usual driving.

On the other hand, when the vehicle runs on the ascending load surface, the fuel temperature elevates according as the engine load increases. As a result, when the fuel temperature reaches 80° C. which is the setting temperature of the thermoswitch 17, the thermoswitch 17 turns on thereby to energize the winding 14A of the relay 14 to close the normally open contact 14a. At this time, assuming that the accelerator pedal is deeply depressed because of hill climbing operation of the vehicle, the detector switch 18 will turn on. Namely, since the normally open contact 14a has been already closed, a power is supplied from the power source 15 to the winding 13A through the normally open contact 14a and the detector switch 18. Thus, the winding 13A of the relay 13 is energized to open the normally closed contact 13a, allowing the operation of the compressor to be interrupted. Accordingly, the engine load increased by the operation of the compressor 11 is reduced because of the interruption of the compressor 11, thus enabling to attain sufficiently vehicle drive performance required for the driving on an ascending road surface.

Figure 3:
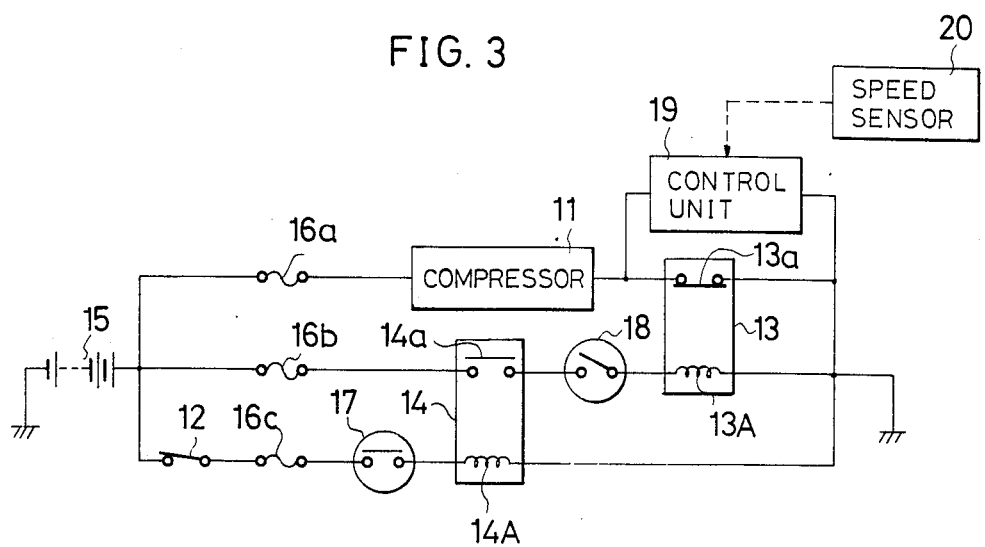
FIG. 3 is a circuit diagram illustrating another embodiment of an operating control device for an air conditioner for use in a vehicle according to the present invention.

FIG. 3 is a circuit diagram showing another embodiment according to the present invention. The embodiment shown in FIG. 3 is characterized in that even during the driving on an ascending road surface, when a vehicle speed is above a predetermined speed, it is judged in the operating control device that an engine output is sufficient for the operation of the compressor, thereby releasing interruption control of the compressor.

Referring more particularly to FIG. 3, a control unit 19 is connected in parallel to the normally closed contact 13a of the relay 13. A signal indicative of vehicle speed sensed by a vehicle speed sensor 20 is input to the control unit 19. The control unit 19 is configured so as to form a circuit bypassing the normally closed contact 13a when the vehicle speed sensed is more than a prescrived value e.g. 60 km/h. The remaining circuit components are identical to those of the circuit of the embodiment shown in FIG. 2, and therefore their explanation will be omitted.

The operation of the circuit shown in FIG. 3 will be described.

When the engine load increased during the driving on an ascending hill, the thermoswitch 17 detects elevation in fuel temperature thereby to be turned on. As a result, the relay winding 14A is energized to close the normally open contact 14a. At this time, if the detector switch 18 detects that the accelerator pedal is deeply depressed thereby to be turned on, the relay winding 13A is energized to open the normally closed contact 13a, thus interrupting the operation of the compressor 11. In this embodiment, even during driving on an ascending road surface, when a vehicle speed sensed by the vehicle speed sensor 20 is above e.g. 60 km/h, the control unit 19 forms a circuit bypassing the normally closed contact 13a which is opened, thereby automatically allowing the compressor 11 to be returned to the operating condition from the interrupted condition. Accordingly, it is avoided that cooling performance is reduced due to unnecessary interruptions of the compressor.

Figure 4:
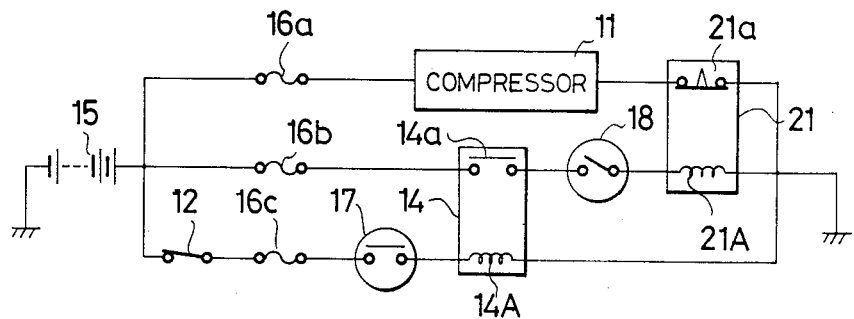
FIG. 4 is a circuit diagram illustrating a further embodiment of an operating control device for an air conditioner for use in a vehicle according to the present invention.

FIG. 4 is a circuit diagram illustrating a further embodiment of the invention. This embodiment is characterized in that the air conditioner automatically resumes its operation a prescribed period after an interruption by means of timer.

More particularly, the detector switch 18 is connected to a winding 21A of a timer relay 21. A normally closed contact 21a which is returned to the original position a suitable time after it is opened is serially connected to the compressor 11. The remaining circuit components are the same as those of FIG. 2 respectively, and therefore their explanation will be omitted.

The operation of the embodiment shown in FIG. 4 will be described.

When the vehicle is running on an ascending road surface, the winding 21A is energized as described above. Accordingly, the normally closed contact 21a is opened, allowing the operation of the compressor 11 to be interrupted. The normally closed contact 21a automatically returns to be turned on a suitable time after the interruption of the compressor 11, e.g. after 10 seconds elapses, thus starting the operation of the compressor 11 in 10 seconds for a second time. Namely, at the initial stage of driving on an ascending road surface, it is necesary to interrupt the operation of the compressor 11, thereby to obtain a sufficient vehicle drive performance, whereas after 10 seconds elapses, the vehicle is ordinarily placed in condition for driving on an ascending road surface with a speed sufficient therefor. In this condition, the interruption of the operation of the compressor is no longer required. For this reason, the operating control device is operative to start the operation of the compressor for a second time using the time relay, thus enabling to optimize the lowering of cooling performance.

As stated above, the operating control device for an air conditioner is constituted so as to interrupt the operation of the compressor based on temperature of fuel supplied into the engine and the condition of the accelerator pedal. Namely, since the device of the invention senses a fuel temperature having response faster than that of cooling water with respect to an increase in the engine load, the device makes it possible to detect an increase in the engine load during the driving on an ascending road surface, thus securely enabling to prevent a time delay in the interruption control of the compressor during the driving on an ascending road surface.

Further, since the operation of the compressor is interrupted due to both elevation of fuel temperature and deep depression of the accelerator pedal, even if the accelerator is deeply depressed at the time of accelerating when the vehicle runs on a flat road surface i.e. when the fuel temperature is less than the setting temperature, the operation of the compressor is not interrupted, without lowering cooling performance. Thus, the device of the invention can perform interruption control in operating the compressor, only during driving on an ascending road surface in which vehicle drive power is insufficient.

Furthermore, even when the interruption control in operating the compressor during driving on an ascending road surface, the device of the invention makes it possible to automatically start the operation of the compressor in accordance with certain conditions, e.g. a vehicle speed more than a predetermined level, or time passage more than a predetermined time. This prevents the operation of the compressor from being unnecessarily interrupted even during driving on an ascending road surface, thus enabling to minimize the lowering of the cooling performance.

The foregoing detailed description has been given for clearness of understanding only, and no unnecessary limitations should be understood therefrom, as modifications will be obvious to those skilled in the art.

What is claimed is:

1. An operating control device for an air conditioner for use in a vehicle comprising:
   means for sensing the temperature of fuel supplied into the engine,
   means for detecting the amount of depression of an accelerator pedal, and
   means for controlling the operation of a compressor of the air conditioner, wherein said controlling means disables the compressor when said sensing means and said detecting means both detect values exceeding predetermined values, respectively.

2. An operating control device of claim 1, wherein said control means comprises a first relay circuit operative when the fuel temperature is above the predetermined value, and a second relay circuit operative to interrupt a power supply circuit including the compressor when said first relay circuit is activated and said detector means detects deep depression of the accelerator pedal.

3. An operating control device of claim 1, which further comprises means for resuming operation of the compressor when a vehicle speed exceeds a predetermined value.

4. An operating control device of claim 2 further comprising a vehicle speed sensor and a second control unit, wherein said second control unit bypasses said second relay circuit when a vehicle speed detected by said sensor exceeds a predetermined value.

5. An operating control device of claim 2, wherein said second relay circuit comprises a timer means for resuming operation of said compressor a predetermined time after interrupting of said power supply.

6. An operating control device of claim 2 wherein said second relay circuit is a timer relay which resumes operation after a predetermined time.

7. An operating control device for an air conditioner for use in a vehicle comprising:
   means for sensing the temperature of fuel supplied to the engine,
   a first relay circuit operative in response to the fuel temperature detected by said temperature sensing means, said first relay circuit being closed when the fuel temperature exceeds a predetermined value;
   switching means operative in response to the operation of an accelerator pedal, said switching means being closed when the accelerator pedal is deeply depressed; and
   a second relay circuit operative in response to said first relay circuit and said switching means, said second relay circuit disabling a compressor of the air conditioner when said first relay circuit and said switching means are both closed.

* * * * *